Aug. 20, 1929.        G. A. PAGE, JR., ET AL        1,724,959
WIRE END SEAL FOR AIRCRAFT
Original Filed March 21, 1927
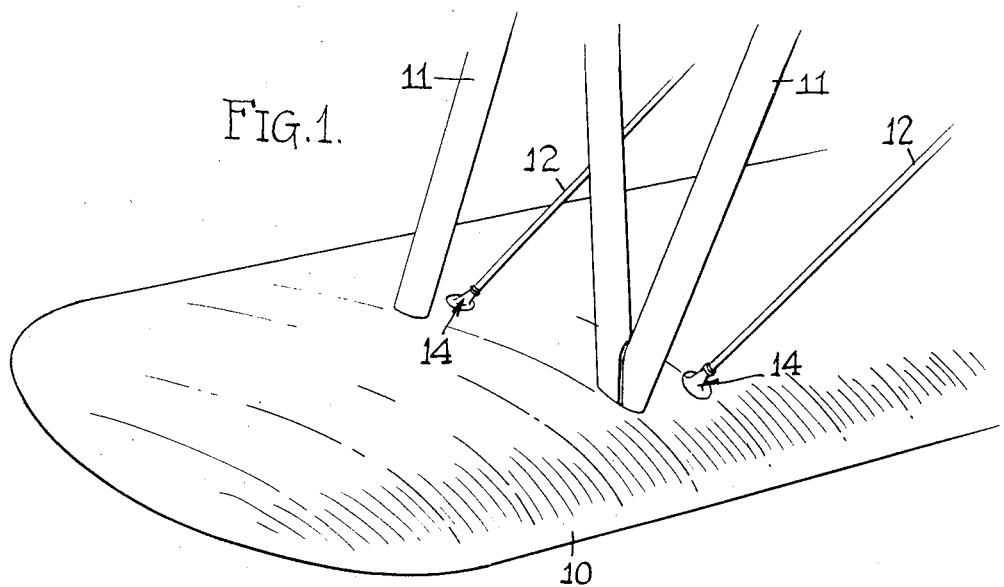
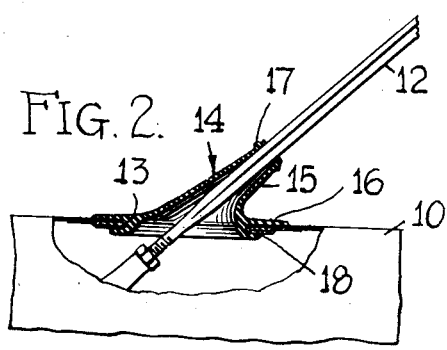
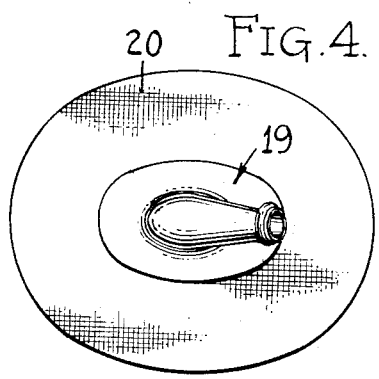
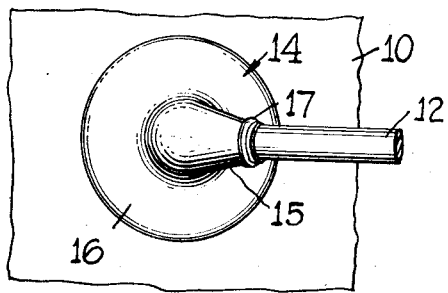
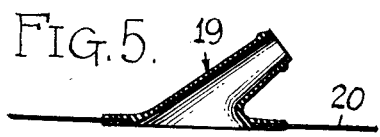
INVENTORS.
GEORGE A. PAGE, JR. AND
BY FRANK H. RUSSELL.

Patented Aug. 20, 1929.

1,724,959

UNITED STATES PATENT OFFICE.

GEORGE A. PAGE, JR., OF FREEPORT, AND FRANK H. RUSSELL, OF HEMPSTEAD, NEW YORK, ASSIGNORS TO CURTISS AEROPLANE & MOTOR COMPANY, INC., A CORPORATION OF NEW YORK.

WIRE END SEAL FOR AIRCRAFT.

Application filed March 21, 1927, Serial No. 176,844. Renewed January 25, 1929.

Our invention relates to aircraft and is more particularly concerned with a seal for an opening in an aircraft structure thru which a brace wire or the like extends.

It is a common practice in aircraft structures, and especially in aeroplanes, to provide in the covering for the wing or wings one or more openings thru which are extended the external brace wires by means of which said wing or wings are trussed. These openings, which are indispensable where hidden fittings are used, are objectionable in that rain water, sea spray, and other moisture is free to drain therethru and to deteriorate, by corrosion, the metal fittings and other metal parts incorporated in the structure of the wing.

An object of the present invention is to overcome the objectionable feature above pointed out by providing in aircraft, a seal or the like for each opening, thru which a brace wire or other similar object is adapted to extend.

A further object of the invention is to provide a seal which can be easily and quickly removed and replaced; which is constructed of rubber and is hence conformable to the cross-sectional shape and size of the wire or other object extended therethru; which, as an article of manufacture, can be cheaply manufactured and profitably used on practically all types of aircraft using hidden fittings for the wire ends; and which is shaped to carry away from the opening over which it is placed, the water draining along the wire length.

Other objects and advantages of the invention will be hereinafter set forth:

In the drawings, wherein like reference characters denote like or corresponding parts, Fig. 1 is a perspective view of the outer end of the lower wing of an aeroplane showing the manner in which the seals can be used;

Fig. 2 is a detail longitudinal vertical sectional view of one of the wire end seals showing its relation to the brace wire extended therethru;

Fig. 3 is a plan view of the structure illustrated in Fig. 2;

Fig. 4 is a view similar to Fig. 3 illustrating a modification, and

Fig. 5 is a section on the line 5—5 of Fig. 4.

In the embodiment of the invention selected for illustration the lower wing 10 of an aeroplane is shown. Said wing 10 has fastened thereto, by any suitable means, the wing struts 11 and brace wires 12, the latter being extended at an angle to the wing and fastened thereto by suitable fittings (not shown) completely enclosed within the wing. The wires 12 may or may not be of streamline section and may or may not have associated therewith a tension adjusting device such as the conventional turnbuckle. To the end that said wires 12 may be anchored to the enclosed or hidden fittings an opening 13 is formed in the wing covering thru which said wire 12 extends.

The openings 13, and particularly the openings formed in the top surface of the wing, are objectionable in that rain water, sea spray, and other moisture is admitted to the interior of the wing. To prevent such admission seals 14 are provided. Each seal 14 is preferably entirely formed of rubber and comprises a substantially sleeve-like body portion 15 having formed at one end thereof an enlargement 16. Said body portion 15 preferably extends off from said enlargement at a given angle and is adapted to receive within the hollow thereof the wire or other object extended thru said opening. At its outer end said sleeve-like body portion is reinforced as at 17, such reinforcement being preferably in the form of a bead or flange by means of which said sleeve at its outer end is appreciably stiffened and all tearing or ripping at said outer end prevented. Said sleeve-like body portion 14 being entirely formed of rubber, is both flexible and resilient, and hence, upon the passage of the brace wire 12 therethru, it conforms to the cross-sectional shape and size thereof to hug tightly at its outer end said brace wire. Thus fitted, the moisture or water draining along the wire length toward the opening 13 is deflected laterally away from said opening and onto the surface of the wing at a point or points distantly removed from said opening.

The enlargement 16 of the seal has formed therein an annular groove 18 by means of which the seal is fastened to the wing. Like the body portion of the seal, the enlargement 16 is also formed or constructed of rubber. In fastening the seal to the wing that portion of the wing covering defining the surrounding wall of the opening is fitted in said groove 18 and by its frictional contact with the walls of the groove said seal is held in place. To remove the seal from over said opening it is but necessary to forcibly withdraw said seal along the wire length until contact between the wall of the groove and the wall of the opening is broken. Moreover, in constructing the seal entirely of rubber, brace wires of different cross-section and of different angularity with respect to the wing structure may be accommodated.

In the modification of Figs. 4 and 5, the seal, designated in its entirety as 19, instead of being provided with a groove such as 18 in the enlarged portion thereof, has vulcanized or otherwise cemented to its enlarged portion an annular fabric strip 20 which may be doped or otherwise fastened to the wing covering which it is adapted to overlap. In either instance, an efficient seal by means of which moisture is excluded from entering the wing thru the openings for the external brace wires, is provided.

While we have shown and illustrated the invention as especially applicable to aeroplane wing structures, it is to be understood that a similar type seal may be used as a closure for any opening in an aircraft structure having extended therethru an object.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What we claim is:

1. As an article of manufacture, a seal for an opening thru which an object extends comprising a rubber sleeve-like body portion having integrally formed thereon at its inner end a flexible enlargement, said sleeve-like body portion being adapted to embrace said object and said enlargement being fastened to and extended beyond the edge of said opening to provide for said opening a closure.

2. As an article of manufacture, a seal of the character set forth in claim 1 wherein said enlargement has formed therein a peripheral groove within which the edge of said opening is fitted.

3. As an article of manufacture, a seal of the character set forth in claim 1, wherein both said sleeve-like body portion and said enlargement are constructed of rubber.

4. As an article of manufacture, a seal of the character set forth in claim 3, wherein both said sleeve-like body portion and said enlargement are moulded in one piece.

5. As an article of manufacture, a seal of the character set forth in claim 1, wherein said sleeve-like body portion is of gradually enlarging inside diameter from its outer to its inner end.

In testimony whereof we hereunto affix our signatures.

GEORGE A. PAGE, Jr.
FRANK H. RUSSELL.